United States Patent
Soman et al.

(10) Patent No.: US 11,657,144 B2
(45) Date of Patent: May 23, 2023

(54) SECURITY-ENHANCED FILE OPEN AND DOWNLOAD

(71) Applicant: VMware, Inc., Palo Alto, CA (US)

(72) Inventors: Sisimon Soman, Sunnyvale, CA (US); Arun Padoor Chandramohan, Singapore (SG)

(73) Assignee: VMware, Inc., Palo Alto, CA (US)

( * ) Notice: Subject to any disclaimer, the term of this patent is extended or adjusted under 35 U.S.C. 154(b) by 620 days.

(21) Appl. No.: 16/679,106

(22) Filed: Nov. 8, 2019

(65) Prior Publication Data
US 2021/0141893 A1  May 13, 2021

(51) Int. Cl.
*G06F 21/53* (2013.01)
*G06F 21/56* (2013.01)
*G06F 16/954* (2019.01)
*G06F 9/455* (2018.01)

(52) U.S. Cl.
CPC .......... *G06F 21/53* (2013.01); *G06F 9/45558* (2013.01); *G06F 16/954* (2019.01); *G06F 21/566* (2013.01); *G06F 2009/45595* (2013.01)

(58) Field of Classification Search
CPC ...... G06F 21/568; G06F 21/566; G06F 21/53; G06F 21/564; G06F 9/45558
See application file for complete search history.

(56) References Cited

U.S. PATENT DOCUMENTS

| 2009/0064301 A1* | 3/2009 | Sachdeva | G06F 21/33 726/9 |
| 2018/0218155 A1* | 8/2018 | Grafi | G06F 21/565 |
| 2020/0065477 A1* | 2/2020 | Surdu | G06F 9/45558 |

OTHER PUBLICATIONS

Hari Pulapaka, "Windows Sandbox", Microsoft Tech Community, Dec. 18, 2018, 27 pages. https://techcommunity.microsoft.com/t5/Windows-Kernel-Internals/Windows-Sandbox/ba-p/301849.
Microsoft.com, "Windows Defender Application Guard overview", Microsoft Inc., Mar. 27, 2019, 3 pages. https://docs.microsoft.com/en-us/windows/security/threat-protection/windows-defender-application-guard/wd-app-guard-overview.
Votiro.com, "Award-Winning Patented Content Disarm and Reconstruction Technology", Votrio Inc., 2019, 5 pages. https://votiro.com/content-disarm-reconstruction-technology/.
Opswat.com, "Deep Content Disarm and Reconstruction (Deep CDR)", 2019 OPSWAT Inc., 7 pages. https://web.archive.org/web/20191004175842/https://www.opswat.com/technologies/data-sanitization.

* cited by examiner

*Primary Examiner* — Dao Q Ho
(74) *Attorney, Agent, or Firm* — Kim & Stewart LLP

(57) ABSTRACT

A method of downloading or opening a file in response to a user input made through an application running in the computer system, includes the steps of detecting by the application that the user input is to download or open a file, issuing a request by the application to a file sanitation server to sanitize the file to remove embedded codes in the file and return the sanitized file, and upon receiving the sanitized file by the application, saving the sanitized file in a folder where the sanitized file can be opened.

13 Claims, 6 Drawing Sheets

SECURITY-ENHANCED FILE OPEN AND DOWNLOAD

BACKGROUND

Types of cyber-attacks change over time. One type of cyber-attacks that is currently prevalent is a malicious script embedded in a file downloaded through the Internet. The file appears to be a harmless file, but once the file is executed, the malicious script infects the computer, functioning as spyware, malware, or a bot that operates as an agent of an external malicious host, and so on.

One possible way to protect a computer from such threats would be to separate the computer's network (e.g., internal network) from an external network with an air gap that physically separates the computer's network from the external network, and prohibit or strictly restrict file downloads from the external network. However, this will prevent the download of even harmless files, and therefore user productivity will be severely compromised. Another possible way would be to introduce a sandbox in each user machine (physical or virtual machine) and open the downloaded file in the sandbox to make sure the file is harmless. This, however, may be expensive to implement and hard to scale. It also requires an understanding of every new malicious scripts and keeping up with them.

SUMMARY

A method of downloading a file in response to a user input made through a browser, according to one embodiment, includes the steps of detecting by the browser that the user input is to download a file, issuing a request by the browser to a file sanitation server to sanitize the file to remove embedded codes in the file and return the sanitized file, and upon receiving the sanitized file by the browser, saving the sanitized file in a folder where the user can open the sanitized file.

A method of opening a file that is attached to an e-mail, according to another e-embodiment, includes the steps of detecting by an e-mail application a user input to open a file attached to the e-mail, issuing a request by the e-mail application to a file sanitation server to sanitize the file to remove embedded codes in the file and return the sanitized file, and upon receiving the sanitized file by the e-mail application, saving the sanitized file and opening the sanitized file.

Further embodiments include, without limitation, a non-transitory computer-readable storage medium that includes instructions for a processor to carry out the above method, and a computer system that includes a processor programmed to carry out the above method.

DETAILED DESCRIPTION

Figure 1:
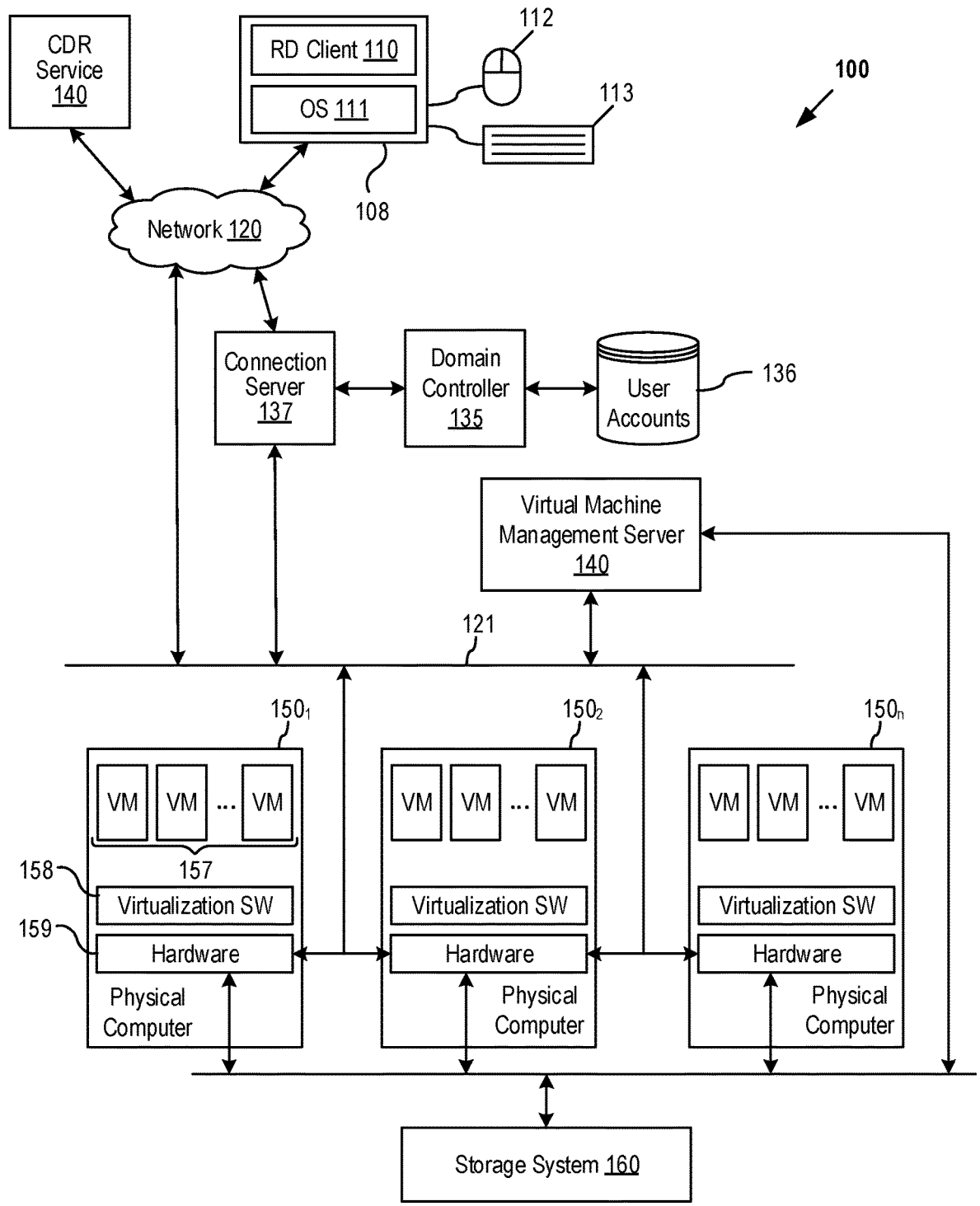
FIG. 1 is a block diagram of elements of a computer system in which one or more embodiments may be implemented.

FIG. 1 illustrates components of a computer system 100 (also referred to as a remote desktop computer system) in which one or more embodiments may be implemented. In computer system 100, remote desktop client software programs (also referred to as "RD clients" for short) run on operating systems of local computing devices. In the embodiment illustrated in FIG. 1, RD client 110 runs on top of operating system (OS) 111 of client device 108. In addition, client device 108 has attached thereto a set of input devices including a mouse 112 and a keyboard 113. Alternatively or additionally, client device 108 may employ a touchscreen as an input device.

RD clients 110 provide an interface for the users to access their desktops, which may be running in one of virtual machines 157 or blade server (not shown) in a data center that is remote from the user locations. The term, "desktop" refers to the instance of an interactive operating environment provided by a computer operating system and software applications, typically in the form of a display and sound output and keyboard and mouse input. With RD clients 110, users can access desktops running in a remote data center through network 120, from any location, using a general purpose computer running a commodity operating system and a RD client software program such as Horizon® View, or a special purpose thin client such as those available from Dell, HP, NEC, Sun Microsystems, Wyse, and others.

Computer system 100 includes a domain controller 135, such as Microsoft Active Directory®, that manages user accounts 136 including user log-in information, and a connection server 137 that manages connections between RD clients and desktops running in virtual machines 157 or other platforms. Domain controller 135 and connection server 137 may run on separate servers or in separate virtual machines running on the same server or different servers. In the embodiments illustrated herein, remote desktops are running in virtual machines 157 and virtual machines 157 are instantiated on a plurality of physical computers 150$_1$, 150$_2$, . . . , 150$n$, each of which includes a hypervisor 158 (more generally, "virtualization software layer") and a hardware platform 159, is controlled by a virtual machine management server 140, and is coupled to a shared persistent storage system 160.

CDR service 140 represents a file sanitation service running in a server that performs content disarm and reconstruction (CDR) operation (also referred to herein as a "sanitation operation") on files that are transmitted thereto or files located at URLs transmitted thereto. Examples of CDR service 140 that are commercially available include OPSWAT® or Votiro™. The CDR operation breaks down a file into its elementary components, removes any embedded codes and other components that do not match the file type's standards and any policies set for the file, such as firewall policies, and then reconstructs the file from its elementary components. The result is a clean version of the file with all potentially malicious code removed from the original version. Because the CDR operation proactively removes all potentially malicious code, it can be effective against zero-day vulnerabilities that would be an unknown threat to security technologies that perform scanning against a library of known viruses and malware.

A particular configuration of the remote desktop computer system is described above and illustrated in FIG. 1, but it should be recognized that one or more embodiments may be practiced with other configurations of the remote desktop computer system.

Figure 2A:
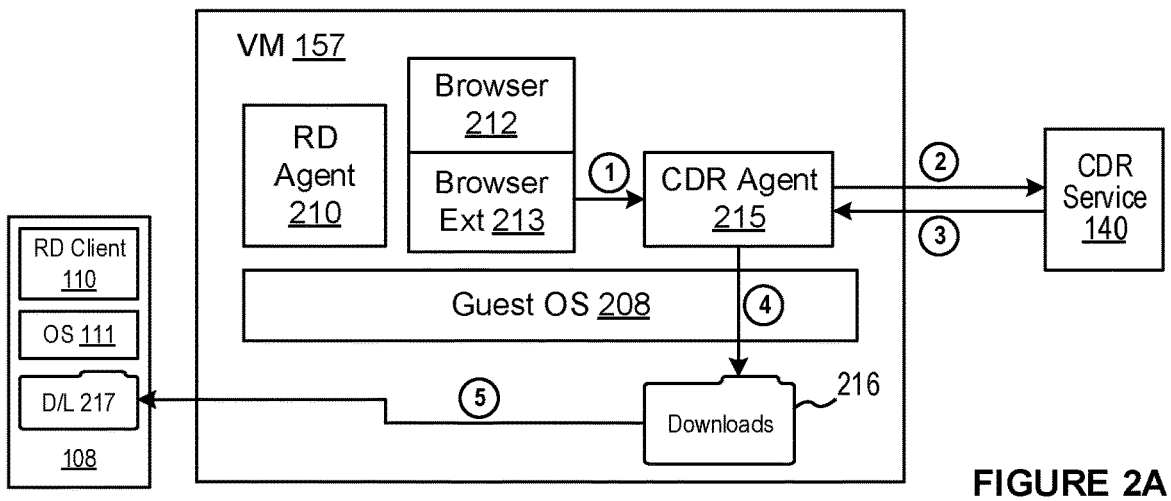
FIGS. 2A-2C illustrate different configurations of a virtual machine in which embodiments may be implemented.
Figure 2B:
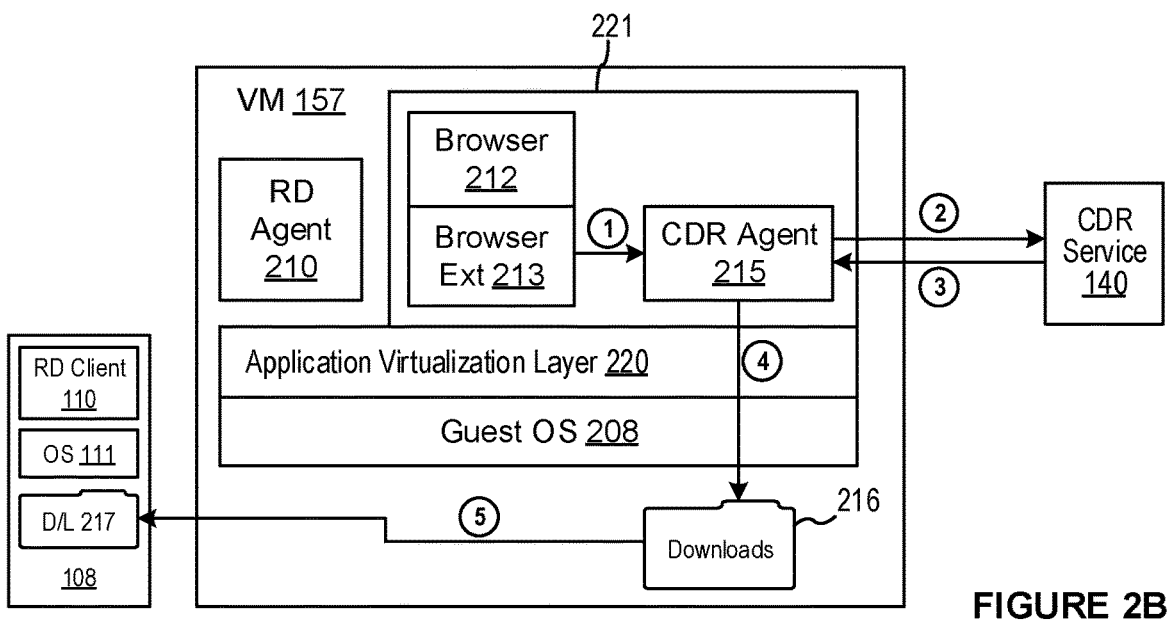
Figure 2C:
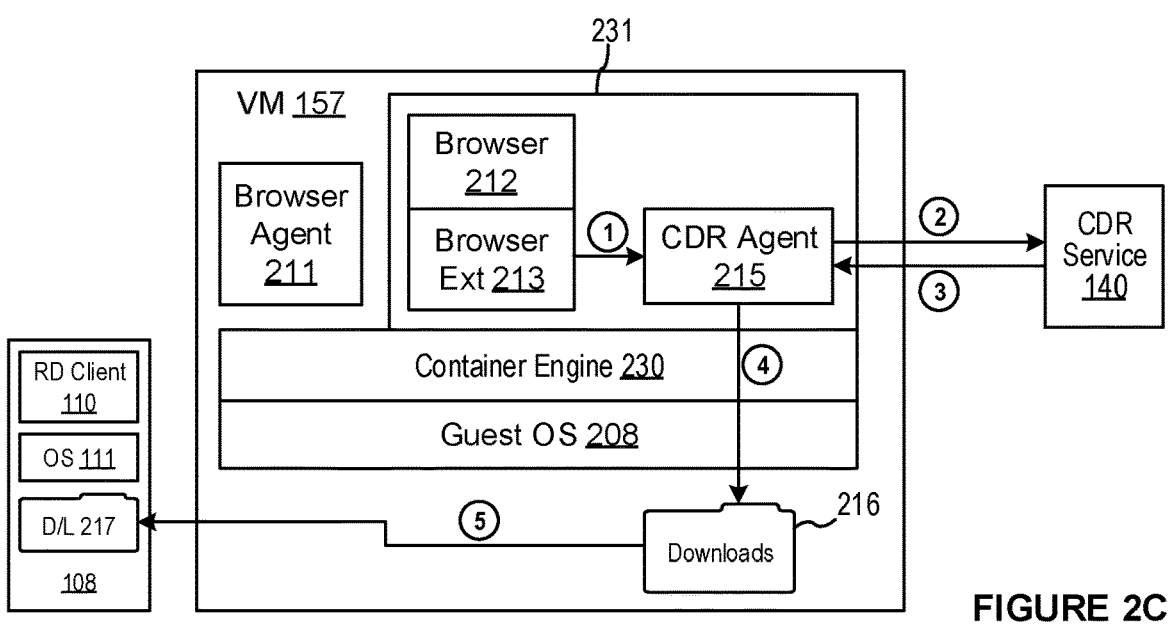

FIGS. 2A-2C illustrate different configurations of VM 157 in which embodiments may be practiced.

In FIG. 2A, VM 157 hosts a remote desktop session that is established with client device 108 through remote desktop (RD) agent 210 and includes a guest OS 208. As illustrated, a browser 212 with a browser extension 213 is running on top of guest OS 208. Browser extension 213 extends the normal functionalities of browser 212 to send downloaded files (or URLs of files to be downloaded) to CDR service 140 through CDR agent 215 and then save the downloaded files returned from CDR service 140 in a "Downloads" folder 216, which is a folder in the remote desktop, and is mapped to a local "Downloads" folder 217 in client device 108 so that, upon synchronization of the two folders, the downloaded files will save back to local "Downloads" folder 217 in client device 108. The order of operation during the downloaded file sanitation or clean-up process is illustrated by the circled numbers 1, 2, 3, 4, 5.

In FIG. 2B, VM 157 hosts a remote desktop session that is established with client device 108 through RD agent 210 and includes guest OS 208. In the example of FIG. 2B, an application virtualization layer 220 creates an application execution space 221 for browser 212, browser extension 213, and CDR agent 215, to isolate these processes from other processes that are running on top of guest OS 208. One example of application virtualization that can be employed here is VMware ThinApp®. By running browser 212 in the isolated execution space, any security vulnerabilities of browser 212 will not infect other processes running on top of guest OS 208. As described above, browser extension 213 extends the normal functionalities of browser 212 to send downloaded files (or URLs of files to be downloaded) to CDR service 140 through CDR agent 215 and then save the downloaded files returned from CDR service 140 in "Downloads" folder 216. As described above, "Downloads" folder 216 is mapped to local "Downloads" folder 217 in client device 108 so that, upon synchronization of the two folders, the downloaded files will save back to local "Downloads" folder 217 in client device 108. The order of operation during the downloaded file sanitation or clean-up process is illustrated by the circled numbers 1, 2, 3, 4, 5.

In FIG. 2C, VM 157 hosts browser 212 and browser extension 213 as a service inside a container 231 that is provisioned by a container engine 230 (e.g., Docker® or Kubernetes® container engine), and communicates with a consumer of this service through browser agent 211. As described above, browser extension 213 extends the normal functionalities of browser 212 to send downloaded files (or URLs of files to be downloaded) to CDR service 140 through CDR agent 215 and then save the downloaded files returned from CDR service 140 in "Downloads" folder 216. As described above, "Downloads" folder 216 is mapped to local "Downloads" folder 217 in client device 108 so that, upon synchronization of the two folders, the downloaded files will save back to local "Downloads" folder 217 in client device 108. The order of operation during the downloaded file sanitation or clean-up process is illustrated by the circled numbers 1, 2, 3, 4, 5.

Browser 212 and browser extension 213 are provisioned as a service in the following manner. When the consumer clicks a browser icon on his or her client device, VM 157 is launched with container 231 running therein. A browser is launched within container 231 and a remote browser UI is transmitted to the consumer's client device. Any downloads requested through browser 212 will be handled by browser extension 213 as described above, such that the downloaded files will be sanitized using CDR, and the sanitized files will save back to a local folder in the consumer's client device. In addition, when the consumer opens a new browser tab, a new instance of container 231 is launched in VM 157 and any browsing by the consumer within the new browser tab will be executed within the new instance of container 231. Alternatively, if higher security is desired, a new VM is launched with a container running therein and any browsing by the consumer within the new browser tab will be executed within the container of the new VM.

Figure 3:
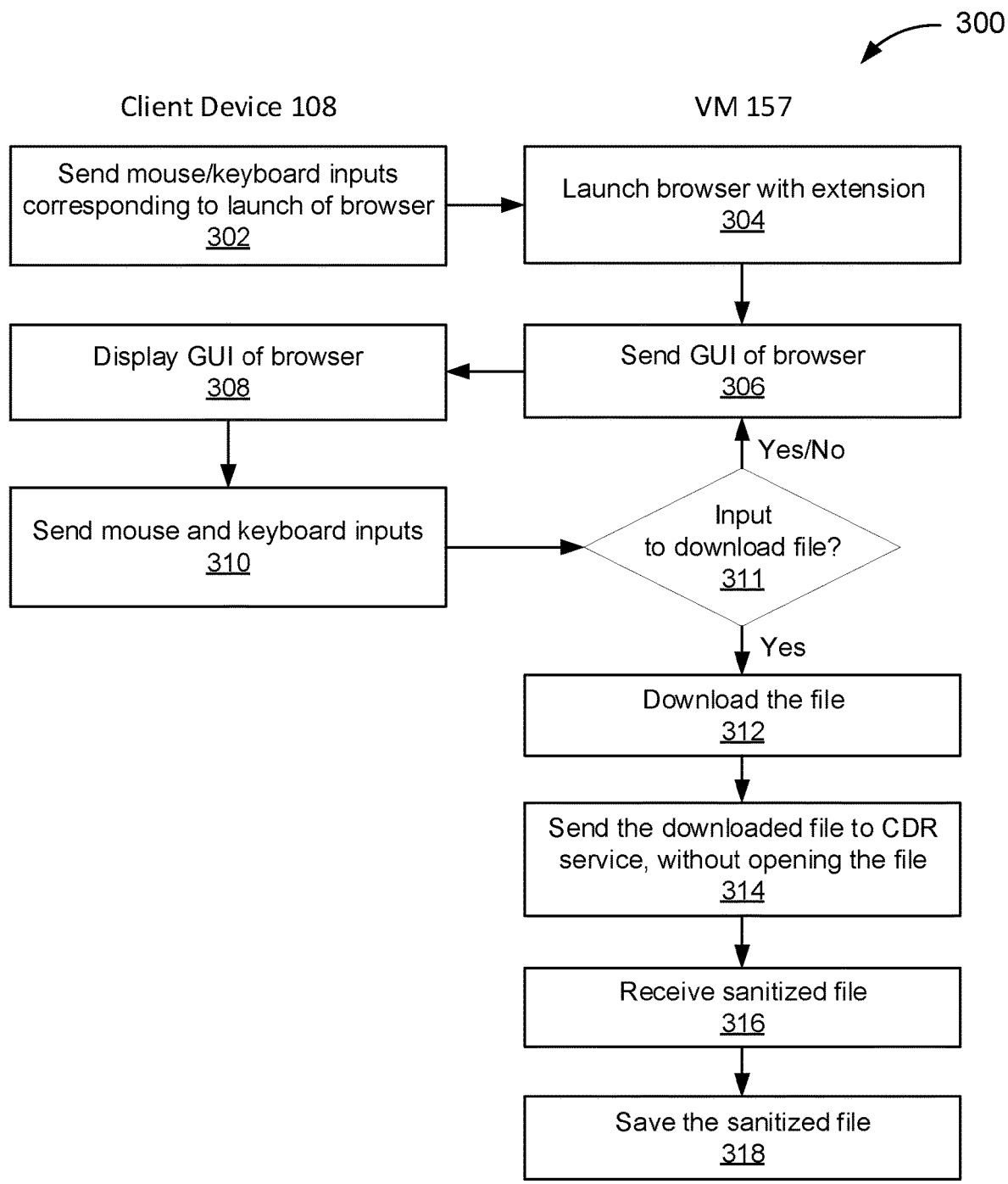
FIG. 3 is a flowchart of a method of downloading a file from a browser, according a first embodiment.

FIG. 3 is a flowchart of a method 300 of downloading a file from a browser according a first embodiment. Method 300 assumes that a user is accessing browser 212 that has browser extension 213 through client device 108.

In step 302, in response to mouse and/or keyboard inputs on client device 108 to launch a browser on the user's remote desktop, client device 108 sends the mouse and/or keyboard inputs to a VM hosting the user's remote desktop to launch the browser. Then, in response to the inputs, the VM in step 304 launches the browser with the browser extension, and in step 306 sends a graphical user interface (GUI) of the browser to client device 108. Client device 108 displays the GUI in step 308 to allow the user to browse the Internet using the browser launched by the VM.

As the user operates the keyboard and mouse of client device 108 while the GUI is displayed, those operations are transmitted as inputs to the VM in step 310. If any input is for downloading a file (Step 311, Yes), the process loops back to steps 306, 308, and 310 and also launches a parallel thread to be executed by the browser extension beginning at step 312. If the determination in step 311 is No, the process loops back to steps 306, 308, and 310 without launching the parallel execution thread.

The browser extension in step 312 downloads the file and in step 314 sends the downloaded file to a CDR service (e.g., CDR service 140), without opening the file, for sanitation or clean-up. Upon receiving the sanitized file in step 316 from the CDR service, the browser extension saves the sanitized file in a "Downloads" folder of the user's remote desktop in step 318, which is mapped to a local folder in client device 108 so that, upon synchronization of the two folders, the sanitized file will save back to the local folder in client device 108. After step 318, the parallel execution thread ends and the user is permitted to open the sanitized file that has been saved into the "Downloads" folder. Upon synchronization of the local folder with the "Downloads" folder, the user will be able to open the sanitized file from the local folder.

Figure 4:
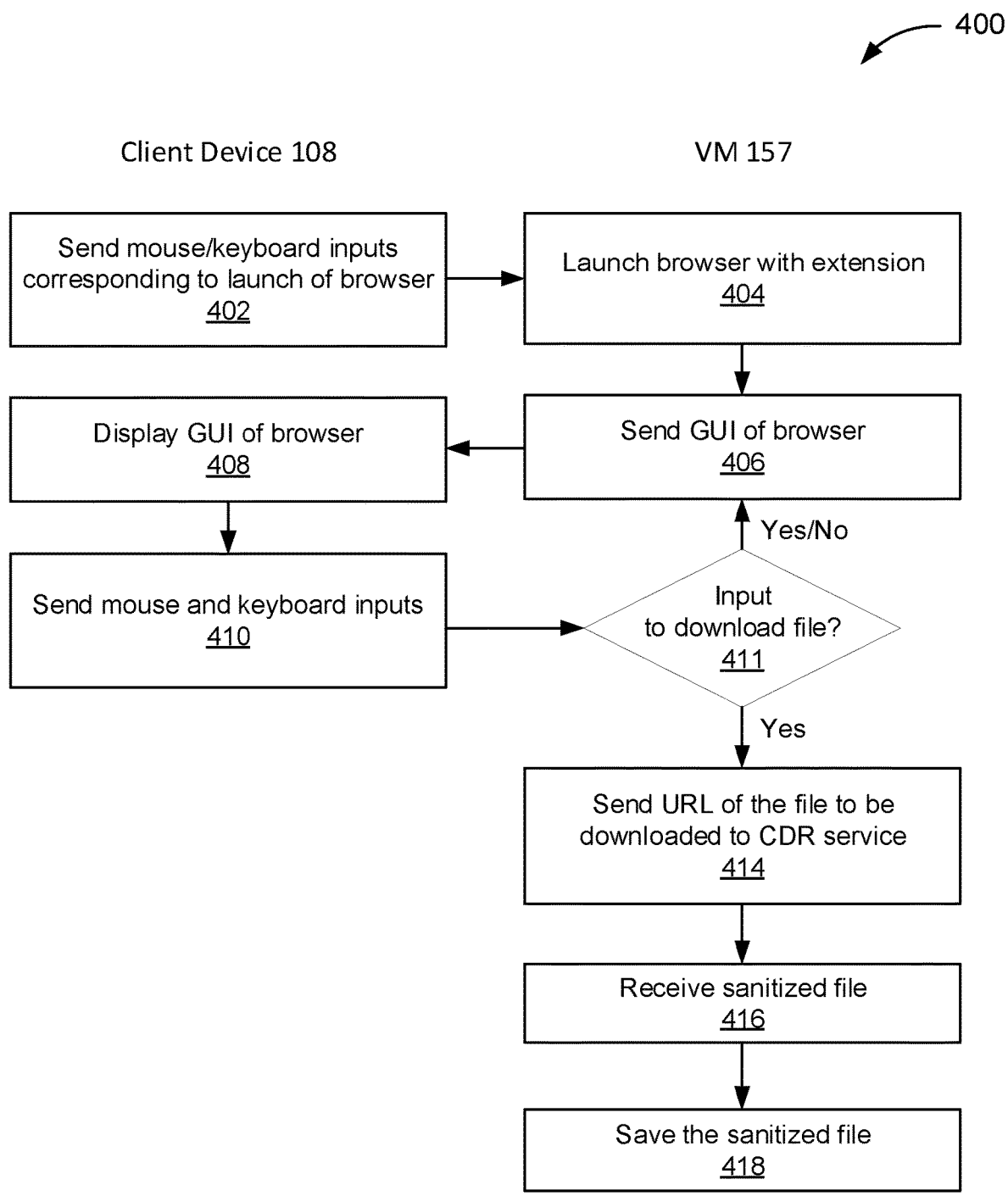
FIG. 4 is a flowchart of a method of downloading a file from a browser, according a second embodiment.

FIG. 4 is a flowchart of a method 400 of downloading a file from a browser according a second embodiment. Method 400 assumes that a user is accessing browser 212 that has browser extension 213 through client device 108.

In step 402, in response to mouse and/or keyboard inputs on client device 108 to launch a browser on the user's remote desktop, client device 108 sends the mouse and/or keyboard inputs to a VM hosting the user's remote desktop to launch the browser. Then, in response to the inputs, the VM in step 404 launches the browser with the browser extension, and in step 406 sends a GUI of the browser to client device 108. Client device 108 displays the GUI in step 408 to allow the user to browse the Internet using the browser launched by the VM.

As the user operates the keyboard and mouse of client device 108 while the GUI is displayed, those operations are transmitted as inputs to the VM in step 410. If any input is for downloading a file (Step 411, Yes), the process loops back to steps 406, 408, and 410 and also launches a parallel thread to be executed by the browser extension beginning at step 412. If the determination in step 411 is No, the process loops back to steps 406, 408, and 410 without launching the parallel execution thread.

The browser extension in step 412 sends a URL of the file to be download to a CDR service (e.g., CDR service 140), for the CDR service to download the file and perform sanitation or clean-up of the downloaded file. Upon receiving the sanitized file in step 416 from the CDR service, the browser extension saves the sanitized file in a "Downloads" folder of the user's remote desktop in step 418. After step 418, the parallel execution thread ends and the user is permitted to open the sanitized file that has been saved into the "Downloads" folder.

Figure 5:
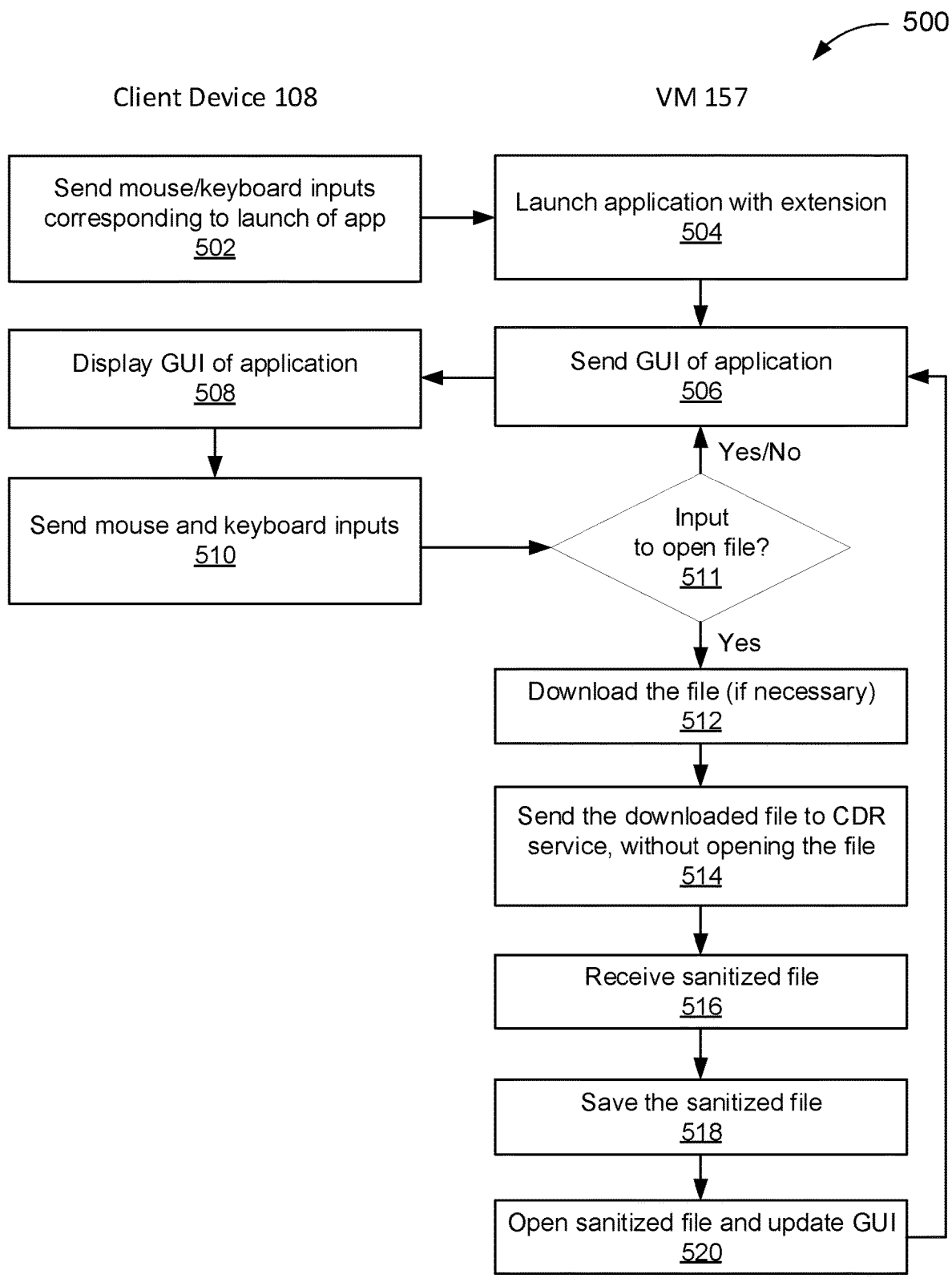
FIG. 5 is a flowchart of a method of opening a file from an application, according a third embodiment.

FIG. 5 is a flowchart of a method 500 of opening a file from an application according a third embodiment. Method 500 assumes that a user is accessing an e-mail application that is running with an extension that extends the functionalities of the application in the same manner that browser extension 213 extends the functionalities of browser 212, through client device 108.

In step 502, in response to mouse and/or keyboard inputs on client device 108 to launch an e-mail application on the user's remote desktop, client device 108 sends the mouse and/or keyboard inputs to a VM hosting the user's remote desktop to launch the e-mail application. Then, in response to the inputs, the VM in step 504 launches the e-mail application with the application extension, and in step 506 sends a GUI of the e-mail application to client device 108. Client device 108 displays the GUI in step 508 to allow the user to make use of the e-mail application launched by the VM.

As the user operates the keyboard and mouse of client device 108 while the GUI is displayed, those operations are transmitted as inputs to the VM in step 510. If any input is for open a file attached to an e-mail (Step 311, Yes), the process loops back to steps 506, 508, and 510 and also launches a parallel thread to be executed by the application extension beginning at step 512. If the determination in step 511 is No, the process loops back to steps 506, 508, and 510 without launching the parallel execution thread.

The application extension in step 512 downloads the file (if the file has not been downloaded yet) and in step 514 sends the downloaded file to a CDR service (e.g., CDR service 140), without opening the file, for sanitation or clean-up. Upon receiving the sanitized file in step 516 from the CDR service, the application extension saves the sanitized file in a "Downloads" folder of the user's remote desktop in step 518. Then, in step 520, the application extension opens the sanitized file and updates the GUI of the e-mail application. After step 520, the process returns to step 506.

Figure 6:
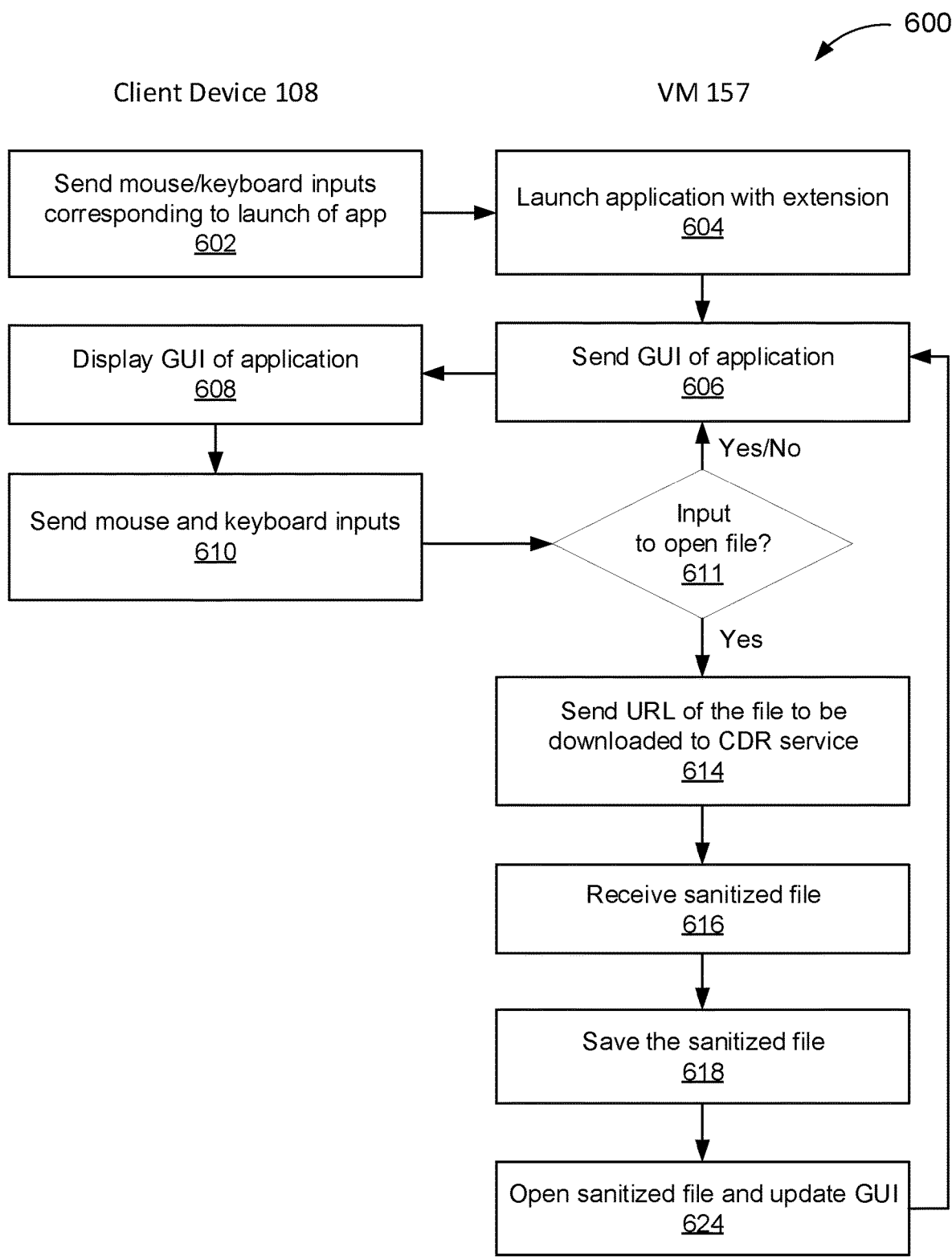
FIG. 6 is a flowchart of a method of opening a file from an application, according a fourth embodiment.

FIG. 6 is a flowchart of a method 600 of opening a file from an e-mail application according a fourth embodiment. Method 600 assumes that a user is accessing an e-mail application that is running with an extension that extends the functionalities of the e-mail application in the same manner that browser extension 213 extends the functionalities of browser 212, through client device 108.

In step 602, in response to mouse and/or keyboard inputs on client device 108 to launch an e-mail application on the user's remote desktop, client device 108 sends the mouse and/or keyboard inputs to a VM hosting the user's remote desktop to launch the e-mail application. Then, in response to the inputs, the VM in step 604 launches the e-mail application with the application extension, and in step 606 sends a GUI of the e-mail application to client device 108. Client device 108 displays the GUI in step 608 to allow the user to make use of the e-mail application launched by the VM.

As the user operates the keyboard and mouse of client device 108 while the GUI is displayed, those operations are transmitted as inputs to the VM in step 610. If any input is for opening a file attached to an e-mail (Step 611, Yes), the process loops back to steps 606, 608, and 610 and also launches a parallel thread to be executed by the browser extension beginning at step 612. If the determination in step 611 is No, the process loops back to steps 606, 608, and 610 without launching the parallel execution thread.

The application extension in step 612 sends a URL of the file to be opened to a CDR service (e.g., CDR service 140), for the CDR service to download the file and perform sanitation or clean-up of the downloaded file. Upon receiving the sanitized file in step 616 from the CDR service, the application extension saves the sanitized file in a "Downloads" folder of the user's remote desktop in step 618. Then, in step 620, the application extension opens the sanitized file and updates the GUI of the e-mail application. After step 620, the process returns to step 606.

In the embodiments described above, sanitation of a file downloaded through a browser or a file attached to an e-mail is performed by a virtual machine that is either hosting a remote desktop or a browser as a service. In an alternative embodiment, the sanitation of a file downloaded through a browser or a file attached to an e-mail is performed by a physical machine, e.g., a desktop, laptop, or notebook computer, a tablet computer, a smartphone, etc.

In addition, the application that is depicted in FIGS. 5 and 6 is an e-mail application. In alternative embodiments, the application is any application that has the functionality to receive a file from external sources and allows the user to open the file. In such a case, the functionality of the application would be extended in the same manner that the browser functionality and the e-mail application functionality were extended as described above to send the file (or a URL thereof) to be opened to a file sanitation server for sanitation or clean-up processing.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of downloading a file in response to a user input made through a remote desktop application running on a client device, comprising:
    transmitting the user input made through the remote desktop application from the client device to a virtual computing instance that is executing in a physical machine connected to the client device over a network and hosting a remote desktop service for the client device;
    detecting, by a browser running inside the virtual computing instance, that the user input is to download a file through the browser;
    downloading the file to the virtual computing instance by the browser;
    issuing, by an extension of the browser running inside the virtual computing instance, a request to sanitize the downloaded file to remove embedded codes in the downloaded file and return the sanitized file;
    sending, by a sanitation agent running inside the virtual computing instance, the request and the downloaded file to a file sanitation server;
    receiving, by the sanitation agent, the sanitized file from the file sanitation server; and
    upon receiving the sanitized file by the sanitation agent, saving the sanitized file in a folder managed by the virtual computing instance.

2. The method of claim 1, wherein the virtual computing instance is one of a plurality of virtual machines that are isolated from each other and executing in the physical machine.

3. The method of claim 1, wherein the browser is running inside an application execution space that is provisioned in the virtual computing instance.

4. The method of claim 1, further comprising:
synchronizing the folder managed by the virtual computing instance with a local folder in the client device, such that the sanitized file is saved in the local folder.

5. The method of claim 1, wherein the downloaded file is not opened in the virtual computing instance before the downloaded file is sent to the sanitation server.

6. A non-transitory computer readable medium comprising instructions executable in a computer system to cause the computer system to carry out a method of downloading a file in response to a user input made through a remote desktop application running in a client device connectable to the computer system over a network, the method comprising:
transmitting the user input made through the remote desktop application from the client device to a virtual computing instance that is executing in a physical machine connected to the client device over the network and hosting a remote desktop service for the client device;
detecting by an application running inside the virtual computing instance, that the user input is to download a file through the application;
downloading the file to the virtual computing instance by the application;
issuing, by an extension of the application running inside the virtual computing instance, a request to sanitize the downloaded file to remove embedded codes in the downloaded file and return the sanitized file;
sending, by a sanitation agent running inside the virtual computing instance, the request and the downloaded file to a file sanitation server;
receiving, by the sanitation agent, the sanitized file from the file sanitation server; and
upon receiving the sanitized file by the sanitation agent, saving the sanitized file in a folder managed by the virtual computing instance.

7. The non-transitory computer readable medium of claim 6, wherein the application is a browser.

8. The non-transitory computer readable medium of claim 7, wherein the browser is running in an isolated execution space.

9. The non-transitory computer readable medium of claim 7, wherein the e-mail application is running in an isolated execution space.

10. The non-transitory computer readable medium of claim 6, wherein the application is an e-mail application.

11. The non-transitory computer readable medium of claim 6, wherein the computer system is a virtual machine.

12. The non-transitory computer readable medium of claim 6, wherein the method further comprises:
synchronizing the folder managed by the virtual computing instance with a local folder in the client device, such that the sanitized file is saved in the local folder.

13. The non-transitory computer readable medium of claim 6, wherein the downloaded file is not opened in the virtual computing instance before the downloaded file is sent to the sanitation server.

* * * * *